United States Patent
Chen et al.

(10) Patent No.: US 7,421,910 B2
(45) Date of Patent: Sep. 9, 2008

(54) STRAIN SENSITIVE COAX CABLE SENSORS FOR MONITORING STRUCTURES

(75) Inventors: Genda Chen, Rolla, MO (US); James L. Drewniak, Rolla, MO (US); Huimin Mu, Milpitas, CA (US); David Pommerenke, Rolla, MO (US)

(73) Assignee: The Curators of the university of Missouri, Columbia, MO (US)

( * ) Notice: Subject to any disclaimer, the term of this patent is extended or adjusted under 35 U.S.C. 154(b) by 154 days.

(21) Appl. No.: 11/245,480

(22) Filed: Oct. 6, 2005

(65) Prior Publication Data

US 2006/0086197 A1    Apr. 27, 2006

Related U.S. Application Data

(60) Provisional application No. 60/616,670, filed on Oct. 7, 2004.

(51) Int. Cl.
*G01L 1/04* (2006.01)
(52) U.S. Cl. .................. 73/862.451; 340/665
(58) Field of Classification Search ............ 73/862.451; 340/665
See application file for complete search history.

(56) References Cited

U.S. PATENT DOCUMENTS

| | | | | |
|---|---|---|---|---|
| 3,763,482 A | * | 10/1973 | Burney et al. | 340/564 |
| 3,862,477 A | * | 1/1975 | Ayers et al. | 29/25.35 |
| 3,921,125 A | * | 11/1975 | Miller et al. | 367/169 |
| 4,183,010 A | * | 1/1980 | Miller | 367/154 |
| 4,598,168 A | * | 7/1986 | Wagner et al. | 174/115 |
| 4,629,925 A | * | 12/1986 | Booth et al. | 310/330 |
| 6,452,105 B2 | * | 9/2002 | Badii et al. | 174/102 R |
| 6,800,809 B2 | * | 10/2004 | Moe et al. | 174/102 R |
| 6,849,799 B2 | * | 2/2005 | Springer et al. | 174/28 |

OTHER PUBLICATIONS

M.W. Lin, A.O. Abatan, Y. Zhou, "High Sensitivity Electrical TDR Distributed Strain Sensor", Proceedings of SPIE, vol. 3986, 2000, pp. 463-471.
M.W. Lin, A.O. Abatan, W.M. Zhang, "Crack Damage Detection of Structures Using Distributed Electrical Time Domain Reflectometry (ETDR) Sensors", SPIE, vol. 3325, 1998, pp. 173-180.
K.M. O'Connor, C.H. Dowding, "GeoMeasurements by Pulsing TDR Cables and Probes", CRC Press LLC, 1999, pp. 139-167.
O'Connor et al., Geomeasurements By Pulsing TDR Cables and Probes, Chapter 8, "Monitoring Structural Deformation", CRC Press, 1999, pp. 207-233.
Su, Quantification of Cable Deformation with Time Domain Reflectometry Techniques, Chapter 10, "Properties of Coaxial Cables", Ph.D. Dissertation, NW U, 1997, pp. 271-278.

* cited by examiner

*Primary Examiner*—Edward Lefkowitz
*Assistant Examiner*—Freddie Kirkland, III
(74) *Attorney, Agent, or Firm*—Greer, Burns & Crain, Ltd.

(57) ABSTRACT

The invention provides increased structural monitoring systems that have sensitive continuous coaxial cable sensors. A preferred embodiment sensor cable of the invention includes an inner conductor, a dielectric jacket, and an outer conductor that is configured to passively deform responsively to strain in an associated structure. The deformation can be aided by the physical structure of the dielectric jacket, the outer conductor, or a combination of both. The deformation translates strain into a measurable change in a reflection coefficient associated with the outer conductor.

13 Claims, 9 Drawing Sheets

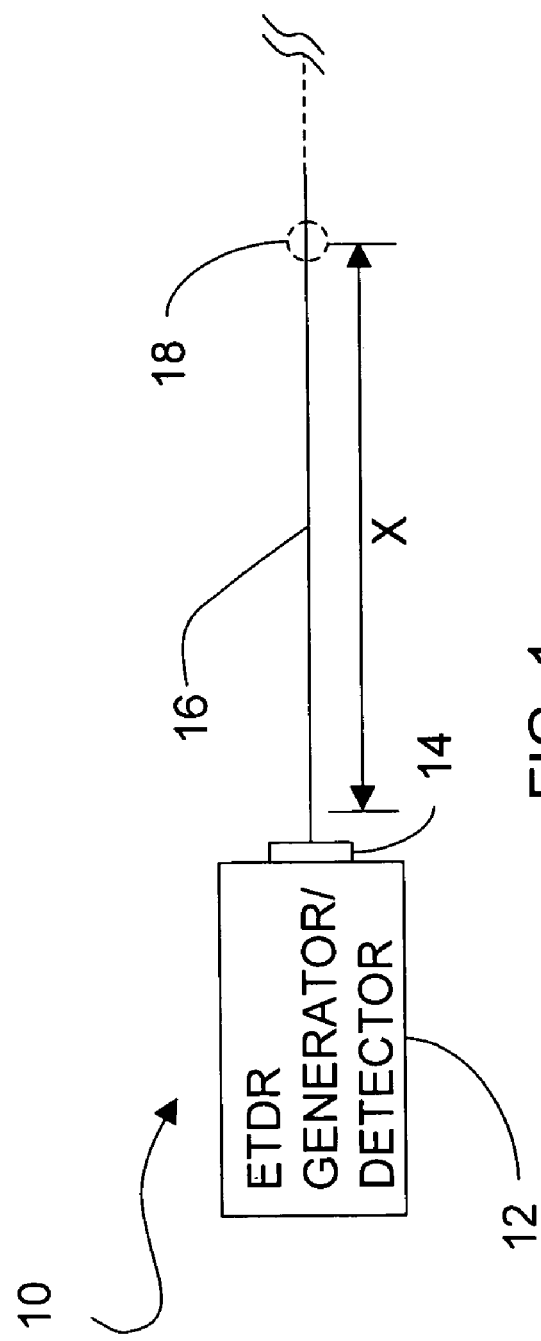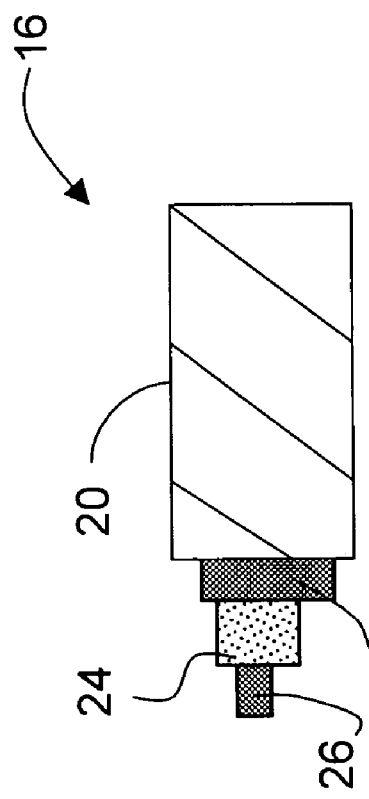

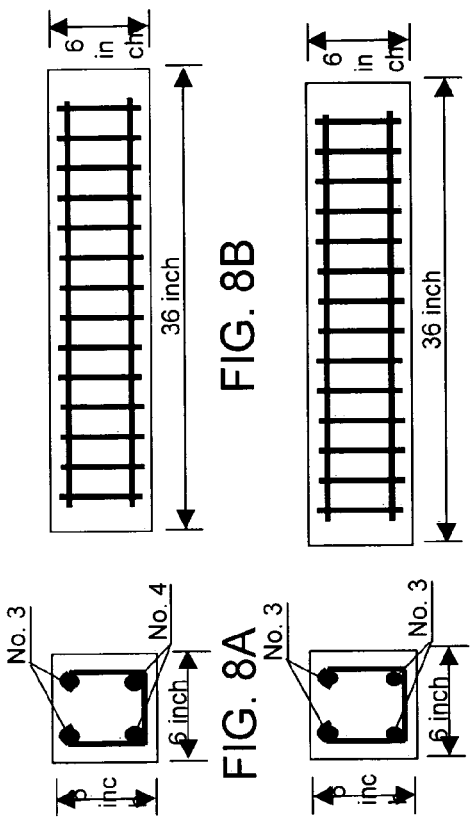
FIG. 8A
FIG. 8B
FIG. 9A
FIG. 9B
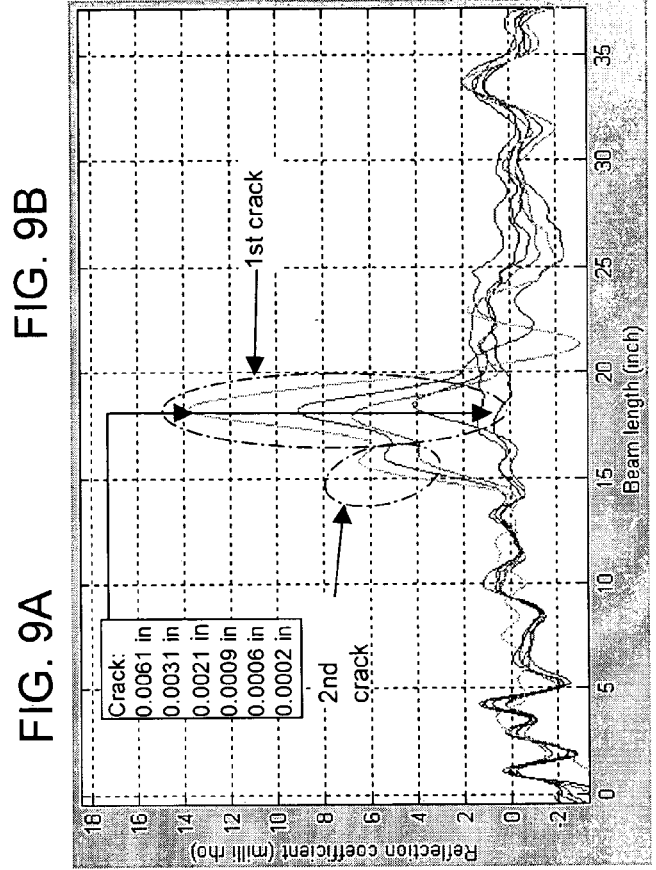
FIG. 10

STRAIN SENSITIVE COAX CABLE SENSORS FOR MONITORING STRUCTURES

PRIORITY CLAIM AND RELATED APPLICATION REFERENCE

This application claims priority under 35 U.S.C. §119 from prior provisional application Ser. No. 60/616,670, filed Oct. 7, 2004.

STATEMENT OF GOVERNMENT INTEREST

This application was made with Government assistance through U.S. National Science Foundation Award Nos. CMS-9733123 and CMS-0200381. The Government has certain rights in this invention.

FIELD OF THE INVENTION

The field of the invention is structural health monitoring. Specific fields of the invention include wave-guided electromagnetic cable sensors using electrical time domain reflectometry (ETDR) and electrical time-domain transmission (ETDT).

BACKGROUND

Electrical Time-Domain Reflectometry (ETDR) uses the propagation of electromagnetic wave to determine the location and nature of various reflectors. Information is derived from reflections of a voltage pulse sent through a transmission medium, namely a transmission cable.

Electrical time domain transmission (ETDT) is another technique that has been used to monitor conductors. In electrical time domain transmission the coupling of two waveguides is monitored. Electrical time domain transmission is used in the semiconductor industry to measure and test circuit responses.

In ETDR, a voltage pulse generated by a signal generator is sent through a transmission cable, and reflections of the voltage pulse are sensed with a time domain reflectometer (TDR) sampling head. When the pulse encounters any discontinuity, for example, partial loss of a cross section of the cable, a portion of it is reflected back towards the sampling head. The arrival time and amplitude of the reflected signal include the information on distance between the points of monitoring and discontinuity, and the severity of damage at the discontinuity point, respectively. The directly measurable parameter, reflection coefficient, represents the percentage of the reflected wave to an incident wave or the change in characteristic impedance of the transmission medium.

ETDR has been developed and used for monitoring the health of cables themselves, such as the cables used in communication systems. Since the 1950s, power and telecommunication industries have used ETDR to locate and identify faults in transmission cables. ETDR has also been applied to a limited extent in other industries and there is interest in using ETDR and sensor cables to monitor other structures. For example, geotechnics has used ETDR to monitor rock masses or other geotechnical facilities that often undergo significant movement in a widespread area. There have also been attempts to monitor other structures, but it is believed that known techniques have produced a small signal-to-deformation ratio. The lack of sensitivity to deformation of commonly used commercial cables greatly limits the general applicability of ETDR for sensing defects in structures, such as structural members in buildings, bridges, roads and the like.

SUMMARY OF THE INVENTION

The invention provides structural monitoring systems that have sensitive continuous coaxial cable sensors. A preferred embodiment sensor cable of the invention includes an inner conductor, a dielectric jacket, and an outer conductor that is configured to passively deform responsively to strain in an associated structure. The deformation can be aided by the physical structure of the dielectric jacket, the outer conductor, or a combination of both. The deformation translates strain into a measurable change in a reflection coefficient associated with the outer conductor.

BRIEF DESCRIPTION OF THE DRAWINGS

FIG. 1 shows an electrical time domain reflectometry structural monitoring system of the invention;

FIGS. 2A-2D illustrate preferred embodiment sensor cables of the invention;

FIGS. 8A and 8B illustrate dimensions and reinforcement for a first set of test RC beams;

FIGS. 9A and 9B illustrate dimensions and reinforcement for a second set of test RC beams;

FIG. 10 shows sensing results of a prototype sensor to the cracking of concrete in a test RC beam;

DETAILED DESCRIPTION OF THE PREFERRED EMBODIMENTS

Figure 2B:
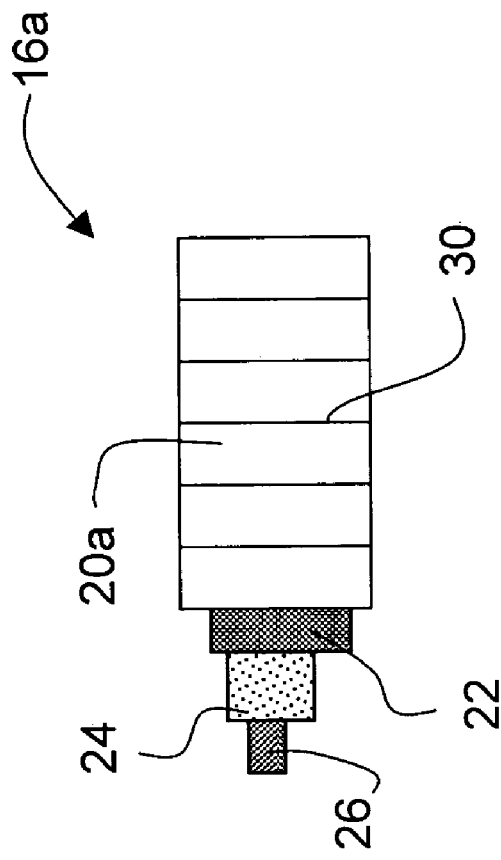

The invention provides structural monitoring systems that have sensitive continuous coaxial cable sensors. A preferred embodiment sensor cable of the invention includes an inner conductor, a dielectric jacket, and an outer conductor that is configured to passively deform responsively to strain in an associated structure. The deformation can be aided by the physical structure of the dielectric jacket, the outer conductor, or a combination of both. The deformation translates strain into a measurable change in a reflection coefficient associated with the outer conductor.

An example outer conductor in preferred embodiments is a thin conductive spiral wrap. Without deformation, the outer conductor essentially forms an electrically continuous cylinder. Strain imparted by an associated structure creates local gaps in the outer conductor. The dielectric jacket can be a flexible continuous material, such as silicon rubber. In other embodiments, the dielectric jacket is a spiral plastic tube. Strain causes localized separations in the spiral plastic tube that impart separations to an outer conductor, such as a spiral wrap or a thin conductive coating, such as a conductive paint or a thin metallization.

A preferred embodiment ETDT sensor cable of the invention includes an inner conductor, dielectric jacket, and an outer conductor and a second outer conductor. An electrical shield separates the outer conductor and second outer conductor. Strain imparted to the sensor cable creates localized gaps in the shield to create coupling between the outer conductor and the second outer conductor.

In a preferred embodiment, a spiral wrapping copper tape is used as outer conductor. Other configurations for the outer conductor are possible, as well. The outer conductor includes a pattern, such as a spiral, repeating slots, or other patterns, that produce a change in electrical reflectance (primarily attributable to the creation of additional inductance) when the dielectric tube is deformed. From an electrical perspective, the outer conductor is a continuous cylinder. From a physical perspective, it is configured create a change in the electrical response at any point along its length where strain of an associated structure creates a deformation of the cable sensor.

Preferred embodiments of the invention will now be illustrated with respect to the drawings. Artisans will appreciate broader aspects of the invention from the preferred embodiments.

Referring now to FIGS. 1 and 2A, a preferred embodiment system for Electrical Time-Domain Reflectometry (ETDR) 10 includes a signal generator and detector 12 that uses an ETDR sensor head 14 to pass signals into a sensor cable 16. Reflections caused along the length of the sensor cable 16, for example, at a distance x from the sensor head by a deformation 18, are reflected back toward the sensor head 14 and detected. The arrival time and amplitude of the reflected signal includes information on distance between the points of monitoring and deformation, and the severity of damage at the deformation 18, providing localized information regarding the deformation. The sensor cable 16, details of which are shown in FIG. 2A, is sensitive to small strains transferred to it by an associated structure over its length, which defines a sensing length. The sensor cable includes structure to translate localized strains in the associated structure into a measurable reflectivity coefficient change.

As seen in FIG. 2A, a preferred embodiment sensor cable 16 includes an outer conductor 20 that is a spirally wrapped conductive foil, e.g., a copper foil that is wrapped around a dielectric jacket 22. The outer conductor 20, for example, can be a copper foil tape adhered to the dielectric jacket 22. The spiral wrapping of the outer conductor has turns that preferably overlap slightly. Small physical gaps are permitted between turns, but in the FIG. 2A embodiment the outer conductor 20 is electrically a cylindrical surface. Alternatively, any two adjacent rounds of the outer conductor can be separated with a small gap, which is bridged by conductive material, such as solder or with conductive paint. The overlap point of adjacent turns of the spiral wraps of the outer conductor 20 serve as points of discontinuity in the outer conductor when a strain is applied to the coax cable sensor as the turns of the outer conductor 20 will separate locally in response to strain imparted locally. This produces a measurable reflectivity coefficient change.

The dielectric jacket 22 is formed from a flexible material, such as silicon rubber, in preferred embodiments which facilitates deformation of the outer conductor 20 both longitudinally and transversely in response to strain of an associated structure. This produces a measurable reflectivity coefficient change. This permits, for example, the sensor cable to passively respond to the strain transferred from concrete when it is embedded in reinforced concrete (RC) members, while the sensor has little or no effect on the stress state of the RC members. The dielectric jacket 22 can also be formed from stiff material, such as plastic, but configured to facilitate deformation of the outer conductor both longitudinally and transversely. For example, the dielectric jacket 22 can be a spiral plastic tube. Separations in the spiral impart gaps to the outer conductor 20, which can be a spiral conductive wrap, for example, or a thin conductive coating that cracks in responsive to separations of spirals in the dielectric jacket 22.

The preferred embodiment sensor cable 16 defines an air gap 24 between the dielectric jacket 22 and an inner conductor 26. The dielectric jacket 22 insulates the inner conductor from the outer conductor 20 over the sensing length of the coax cable sensor 16. The small air gap 24 between the inner conductor 26, a single wire in a preferred embodiment, and dielectric jacket 22 reduces friction between the inner conductor and the dielectric. This facilitates their relative movement. The air gap also reduces overall axial stiffness of the sensor cable, aiding its installation in structures of interest. The small air gap 24 also facilitates the longitudinal elongation of the dielectric jacket 22 when stresses are applied to the cable sensor 16 from an associated structure.

Features of the cable sensor 16 may be optimized for particular applications. The relative dimensions, number of spiral turns in preferred outer conductors and dielectric jackets can be optimized. The general equation for ETDR measurements is F $$\Gamma = \frac{Z_{C0} - Z_0}{Z_{C0} + Z_0},$$

where $\Gamma$ is the reflection coefficient, $Z_{C0}$ is the impedance at a strain measurement point, and $Z_0$ is the cable's characteristic impedance. The reflection coefficient can also be expressed as a function of the material's Poisson's ratio, axial strain, and cable diameter as $$\Gamma = \frac{\ln(1 - ve_{axial})}{2 \cdot \ln\left(\frac{R_2}{R_1}\right) + \ln(1 - ve_{axial})},$$

where $R_2$ is the outer diameter of the dielectric jacket 22, $R_1$ is the inner diameter of the dielectric jacket 22, v is the Poisson's ratio, and $e_{axial}$ is the axial tension strain. The responsiveness of the dielectric jacket 22 to axial strain can be set by its configuration and by the material that it is formed from. The embodiments discussed with respect to FIG. 2A provide excellent response to small strains of associated structures. In addition, it is apparent that ratio of $R_2/R_1$ can be used to increase Poisson's ratio. As axial strain and Poisson's ratio increase, the measurement signal for ETDR increases in a linear fashion.

Figure 2C:
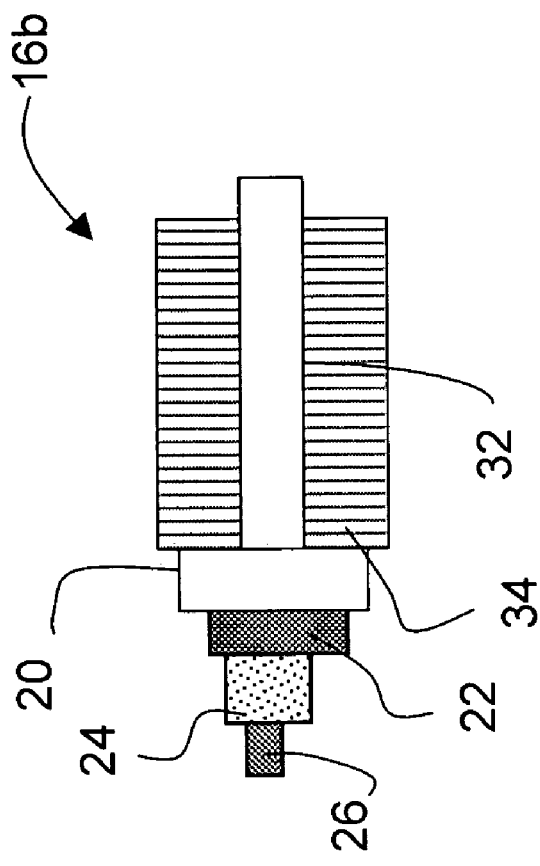
Figure 2D:
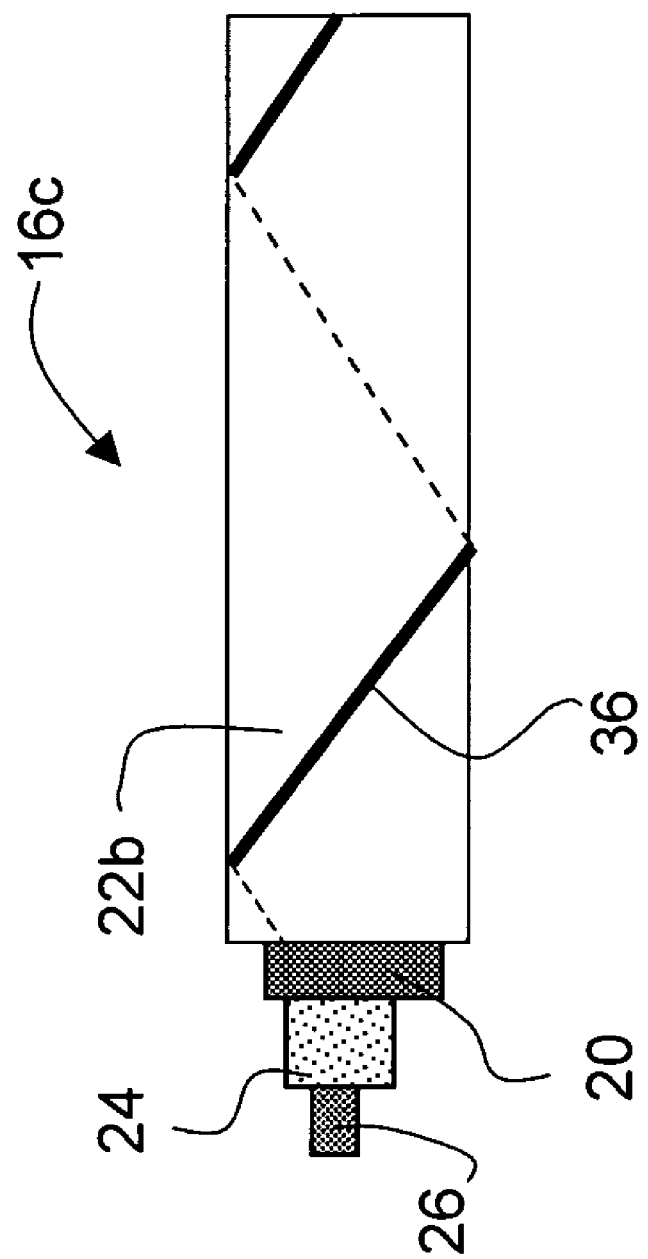

FIGS. 2B-2D show addition embodiment cable sensors that are generally based upon the FIG. 2 embodiment, and like reference numbers are used for like elements. Each includes structures that convert strain locally into a measurable reflectivity coefficient change. In FIG. 2B, a cable sensor 16*a* has an outer conductor 20*a* is a series of small length cylinders, which may be individual conductive tape wraps, or a continuous conductive material that is scored, perforated, or thinned into periodically to create periodic points of discontinuity at lines 30 that will easily crack or separate in response to strain from an associated structure.

Figure 3A:
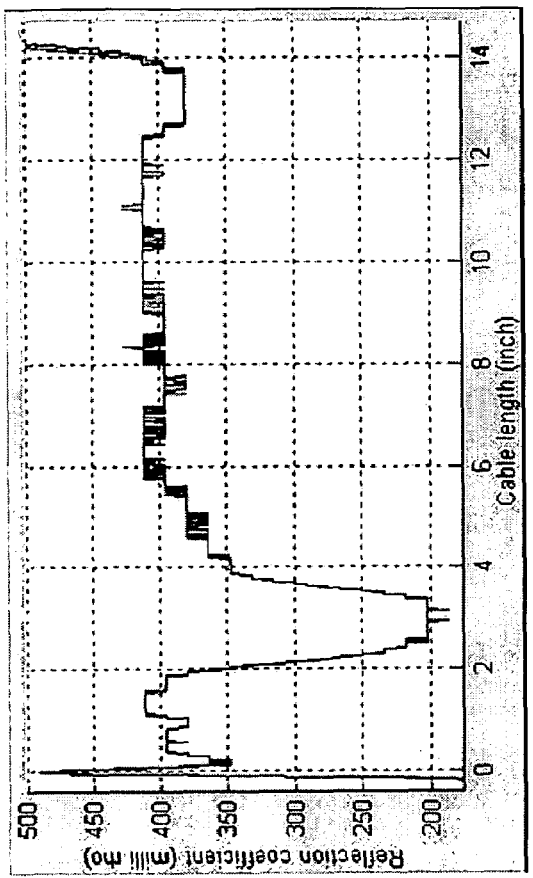
FIGS. 3A and 3B compare sensitivity of a coax cable with a braided copper outer conductor (FIG. 3A) to an experimental prototype cable sensor in accordance with FIG. 2A (FIG. 3B)
Figure 3B:
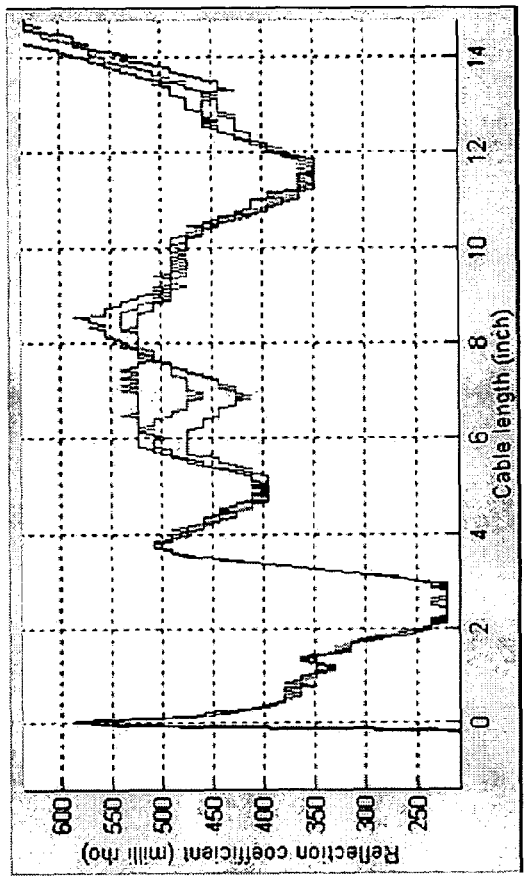
Figures 4A, 4B, 4C, 4D:
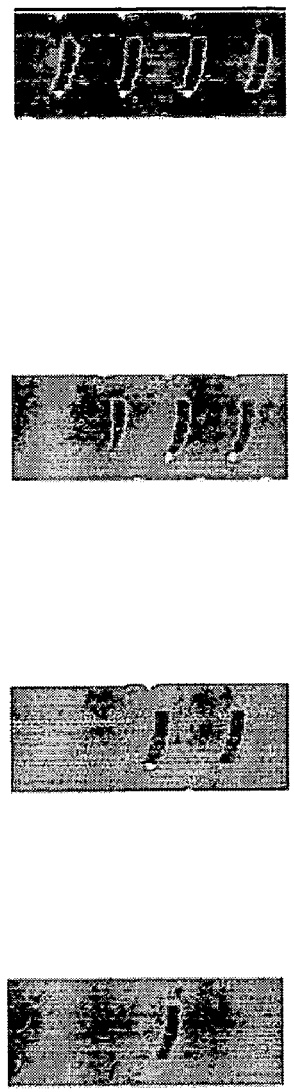
FIGS. 4A-4D respectively illustrate finite difference time domain (FDTD) models of simulated sensors that model the FIG. 2A cable sensor with one to four spiral turns separated in the outer conductor.

In FIG. 2C, a cable sensor 16b is configured for ETDT, an includes a second outer conductor 32 separated from the outer conductor 20 by a shield 34. In FIG. 3B, the second outer conductor is, for example, an insulated wire or plurality of wires. The shield 34 is spirally formed, perforated, thinned, etc., periodically so that strains will impart gaps in the shield 34. The outer conductor 20 acts as a first waveguide and the second outer conductor acts as a second waveguide. Strain that creates gaps in the shield 34 causes a coupling between the outer conductor 20 and the second outer conductor 32.

In FIG. 2D, a cable sensor 16b includes an outer conductor 20b is a thin continuous conductor, such as a metal layer or a conductive paint. The dielectric jacket 22 is a soft dielectric, such as foam rubber, for example. The outer conductor is wrapped with a constrictor 36, such a relatively stiff spiral steel wire. Elongation of the cable sensor causes the constrictor 36 to increase the reduction of cable cross section.

Cables sensors, ETDR and TDT systems of the invention provide for highly sensitive structural monitoring devices. The sensitivity of cable sensors of the invention was investigated with experiments. The experiments and data will now be discussed. Artisans will recognize additional features and advantages of the invention from the discussion. Artisans will also recognize that techniques and specific structures of cables sensors constructed for experiments will have corollaries in mass manufacturing techniques that will differ somewhat from the experimental prototypes.

Experimental Data

A comparative test was conducted on two identical cables except for their outer conductors. One cable was a prototype cable sensor consistent with FIG. 2A. The structure was as in FIG. 2A, with an air gap between the inner conductor and the dielectric jacket. The inner conductor was a single wire, the dielectric jacket was rubber, and the outer conductor was spirally wrapped copper tape. The other was made with a braided copper shielding as the outer conductor. Each cable was set up with one end fixed and the other end roller supported. An axial load was applied at the end of the roller support. Their experimental results at two strain levels are presented in FIGS. 3A (braided copper cable) and 3B (prototype cable sensor of the invention). It is clearly shown that the prototype cable sensor has sensitivity of several orders higher than the sensor with the braided copper shielding. During the test of the prototype cable sensor of the invention, a significant increase in reflection coefficient was observed when two adjacent rounds of the spiral wrapping tape separated completely. On the other hand, for the cable with the braided copper shielding, it was difficult to differentiate the reflection coefficients at different strain levels. The tooth pattern of measurement was due to the slow sampling rate used during testing. Note that the manual assembly approaches used in the experiment were copper tape was manually wrapped and held to the dielectric jacket by conductive adhesive include significant non-uniformities that would not be present in commercially manufactured cable sensors. Accordingly, manufacturing techniques are expected to increase sensitivity and permit use of other materials for the outer conductor such as patterned metal coatings, conductive paints and epoxies, etc.

Numerical Simulations

Four prototype sensors consistent with FIG. 2A were made and used in bending tests of RC beams. Their dimensions and characteristic impedance are presented in Table 1. The diameter of the sensors and the width of the copper tape were determined based on the available materials from the market and the insight gained through the analytical study. These sensors can be classified into two groups by their size; Sensor-I and Sensor-II have a larger diameter of outer and inner conductor than Sensor-III and Sensor-IV. Each group has two cables with different copper tape widths. The dimension of the cable determines the cable's characteristic impedance and the value of the extra inductance. The copper tape width determines the density of the separation turns, which leads to the different values of extra inductance.

TABLE 1

Types of prototype sensors considered

| Sensor | Diameter of the inner conductor | Diameter of the outer conductor | Spiral wrapping copper tape width | Characteristic impedance |
|---|---|---|---|---|
| I | 1/32" | 5/16" | 1/8" | 97 Ω |
| II | 1/32" | 5/16" | 1/4" | 97 Ω |
| III | 1/42" | 1/8" | 1/8" | 69 Ω |
| IV | 1/42" | 1/8" | 1/4" | 69 Ω |

Before embedding each sensor into concrete, numerical simulations were conducted to better understand and verify the sensor's performance. They were carried out with the FIDELITY software to investigate the sensor's response and its sensitivity. The Finite Difference Time Domain (FDTD) model of the simulated sensors is shown in FIGS. 4A-4D, which respectively show the separation of one to four turns of the outer conductor. The sensors are simulated under different situations when the spiral wrapping copper tape is either partially separated or completely separated to separate one to four turns. For the outer conductor in the simulation, sufficiently thin spiral wires are accumulated to model the spiral wrapping copper tape. A small gap was created to represent the separation part. The sensors were excited by a Gaussian impulse, which was integrated over the time to obtain the ETDR voltage waveform. By definition, the reflection coefficient can be determined by integrating the voltage waveform over the time.

Figure 5:
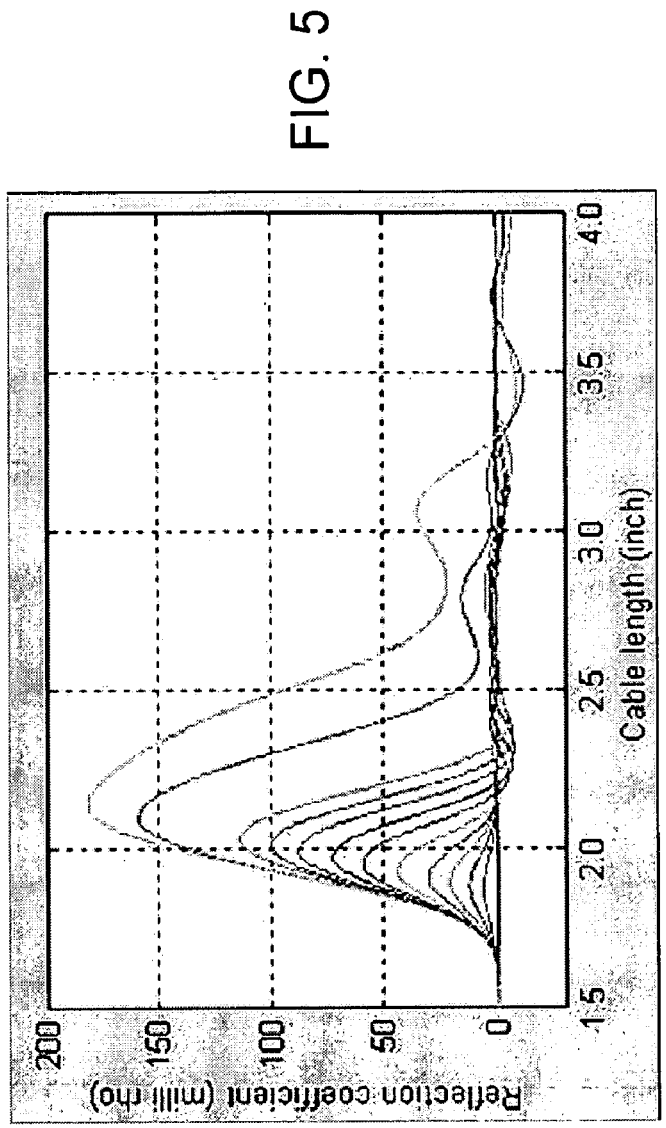
FIG. 5 illustrates the typical simulated results (reflection coefficient) using Sensor-III as an example by varying the separation conditions in increments of 0.2 from 0 turns separated to 4 terms separated.

FIG. 5 illustrates the typical simulated results (reflection coefficient) using Sensor-III as an example by varying the separation conditions in increments of 0.2 from 0 turns separated to 4 terms separated. Only the waveforms in the separation of spiral wrapping copper tape part are shown in the figure. Partial separation of the spiral wrapping copper tape is expressed by a decimal value. For example, 0.2 turns mean that the copper tape separates for 20% of one complete turn. It is seen from the simulation results that the sensor is very sensitive to the configuration change of the outer conductor. One turn separation of the copper tape changes the reflection coefficient by 0.04~0.06 or 40~60 milli rho. By increasing the turns of the separation, not only the peak value of the reflection coefficient but also the band width of the waveform increases.

Figure 6:
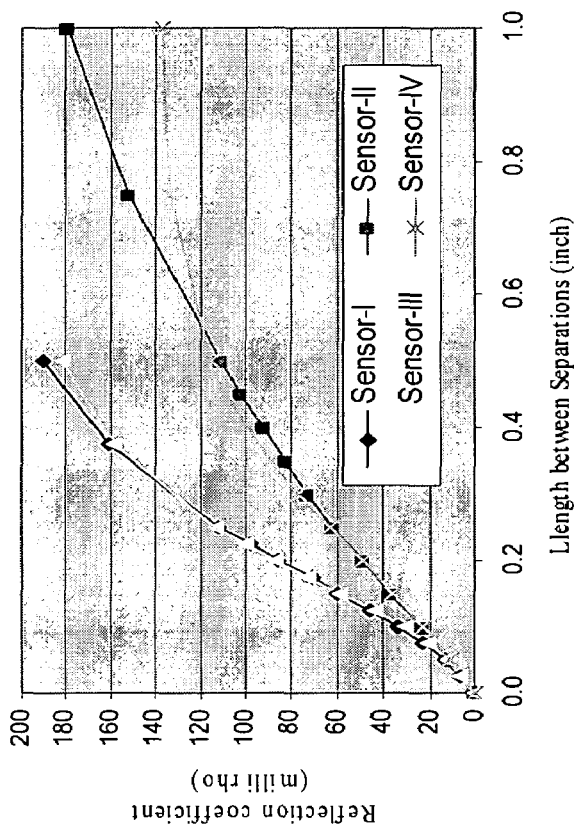
FIG. 6 illustrates the relationship between the reflection coefficient and the length between separations for a number of prototype sensors.

The length between separations of the outer conductor and the turn density can more precisely describe the sensors' behavior when the sensors are embedded in concrete because the length between separations is directly related to the crack width. Therefore, it is necessary to convert the number of turns into the length between separations to examine the sensors' performance. FIG. 6 illustrates the relationship between the reflection coefficient and the length between separations. It can be observed from the figure that the sensors made of 1/8-inch-wide copper tape (Sensor-I and Sensor-III) provide a larger value of the reflection coefficient because of their higher turn density. The higher turn density corresponds to a larger value of the extra inductance for a certain length between separations, and this leads to a larger value of the reflection coefficient. The highest slope of the curves in FIG. 6 corresponds to the most sensitive range of the separation distance. This range can be used to guide an optimum design of a sensor. For Sensor-I and Sensor-III, this range is between 0.1 and 0.25 inch, over which the reflection coefficient linearly increases with the length between separations. Since the width of a concrete crack of engineering interest is less than 0.1 inch, the length between separations of a sensor embedded in the concrete is likely within 0.3 inch due to sudden release of energy associated with a crack. Therefore, the two sensors made of a ⅛-inch-wide copper tape are expected to perform satisfactorily.

FIG. 5 shows that as more turns of the outer conductor become separated, the reflection coefficient of each sensor increases nonlinearly. This is because the reflection coefficient increases nonlinearly with the extra inductance, and the extra inductance caused by the separation of the outer conductor (copper tape) proportionally increases with the square of the separation turns. As a result, the reflection coefficient relates to the separation turns in a nonlinear fashion. Physically, corresponding to a small separation, the extra inductance is small. It creates a small perturbation in the transmission line reflected by a small reflection coefficient. With the further development of more separation turns, the boundary effect from the far end of the wave propagation attenuates and, therefore, the reflection wave at the near end eventually saturates at the asymptotical value corresponding to an infinite long cable with uniform separation.

Figure 7:
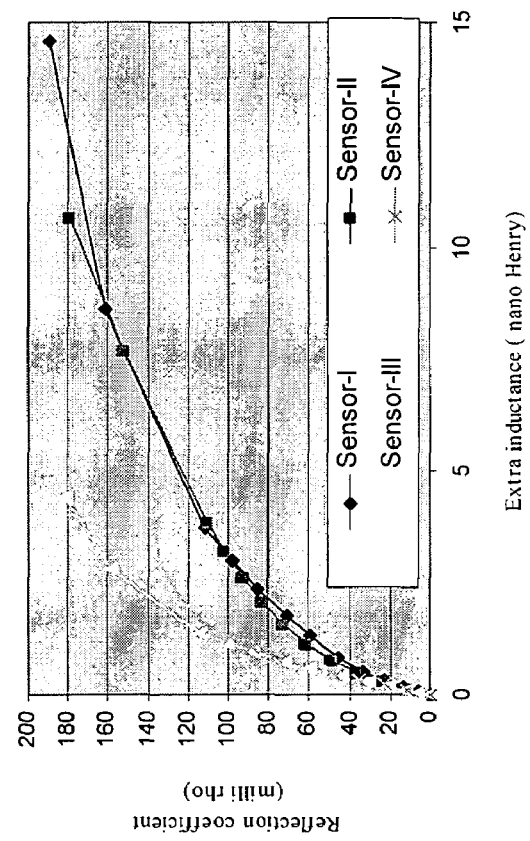
FIG. 7 illustrates reflection coefficient as a function of the extra inductance for a number of prototype sensors.

To fully understand the sensors performance, it is helpful to examine the value of the extra inductance. The value of the extra inductance can be determined according to the ETDR waveform from the simulation results. For the four sensors under investigation, the reflection coefficient can be plotted as a function of the extra inductance, as shown in FIG. 7. The value of the extra inductance is in the order of nano Henry for these four sensors, which belongs to the sensitive range. The reflection coefficient increases nonlinearly with the extra inductance. The smaller the characteristic impedance of sensors (Sensor-III and Sensor-IV), the higher their sensitivity. Considering the slope of the curves in FIG. 7, Sensor-III and Sensor-IV are in the best sensitive range under four complete separation turns. While for Sensor-I and Sensor-II, due to the large value of the extra inductance for three and four separation turns, the curves become less and less sensitive. Combining the observations from FIGS. 6 and 7, it can be concluded that within the same length between separations, which is associated with the crack width, Sensor-III is considered as the best design among the four sensors due to its smaller geometry, smaller characteristic impedance and high sensitivity.

CABLE CALIBRATION

When embedded in concrete, a cable sensor of the invention can be used to measure the strain along the length of the sensor or the elongation at the location of cracks. To correlate the reflection coefficient from ETDR measurements with the strain applied on the sensor, calibration tests were conducted on Sensor-III before the sensors were put into concrete beams. Each sensor was made with a single wire of 24 AWG. The calibration of the sensors was carried out with tension tests. To investigate the effect of separation turns on the reflection coefficient, the sensors tested had a varying number of turns of the spiral wrapping copper tape.

Test Setup

Strain tests were conducted on prototype coax cable sensors of the invention. Small sections of prototype cable sensors were created in a longer cable that had a convention construction. Each prototype cable sensor was set up in the horizontal position during the tests. The cable sensor was loaded at both ends with a pair of equal loads to minimize potential deformation at fixed supports since the rubber dielectric jackets used in the prototype cable sensors is very flexible and can be easily stretched with a small load. To ensure the potential sagging of the cable to the minimum, additional support was provided around the mid-span. The elongation of the cable was measured with an LVDT toward a right end of the cable. As mentioned above, only a portion of the tested cables was constructed in accordance with the invention, while the remaining portions were similar to commercial cables. The deflection measured over the entire length of a cable is converted into the strain applied on the portion of the cable constructed according to the invention based on its stiffness and length relative to the remaining portion.

Test Results and Analysis

The results showed a jump in reflection coefficient a certain strain level that corresponded to the separation of spiral turns of the copper outer conductor. All measured curves showed a different degree of slope jump at a certain strain level which corresponds to a significant separation of adjacent turns. However, the slope jump occurred at different strain levels even for the identical cables. This inconsistency of the separation of the cables was due to the non-uniformity of the fabrication of the prototype cables, which results from the manual assembly techniques and would be eliminated or minimized in a commercial produced cable sensor of the invention.

Overall, the tests confirmed that the peak value of the reflection coefficient increases with the separation turns. The results also shows that as load increases, the dominant wave grows steadily in terms of amplitude and bandwidth except for a quick jump at a certain strain level. Additionally, it was observed that the dominant peak was attributable to the cable section constructed according to the invention.

Flexural Tests of RC Members

Test Specimens and Setup

From the calibration tests, it was found that the cable sensors of the invention were highly sensitive to applied strain. To understand their sensitivity in applications, a dozen cables were fabricated in accordance with FIG. 2A and they were mounted in pair near the tension surface of each of six RC beams. Three of the beams had two No.3 longitudinal rebars and the other three were reinforced with two No. 4 rebars. Each sensor was fabricated with a rubber tube dielectric jacket and spirally wrapped copper tape outer conductor. Sensor-I was mounted on Beam 1c and Sensor-IV was on Beam 2a. The details of dimension and re-enforcement for test beams 1a, 1b, and 1c are shown in FIGS. 8A and 8B. The details of dimension and re-enforcement for test beams 2a, 2b, and 2c are shown in FIGS. 9A and 9B.

Test Results and Discussions

Representative results are presented for of two of the RC beams that were tested with a Tinius Olsen loading machine. The deflection of each beam was measured using a dial gauge.

Under progressive loading, Beam 2a cracked mainly at midspan. The first dominant crack passed through half of the section and the second crack, approximately two inches from the first one, was observed during the tests. The concrete crack occurs at 4 kips and the reinforcement of the beam yields around 10 kips. Sensor IV showed sensitivity to the two cracks that were inches apart as seen in FIG. 10. Corresponding to the crack patterns observed in the beams, the reflection coefficient along the entire length of the beam reaches the maxima at two locations, one more significant than the other, as seen in FIG. 10. It is also observed that the reflection coefficient, other than the mid-span region, is all within 0.002~0.003, indicating small elongation in the non-cracking area. The reflection coefficient shown in FIG. 10 represents the difference of measurement at any load from the baseline measurement when the beam is unloaded.

Figure 11:
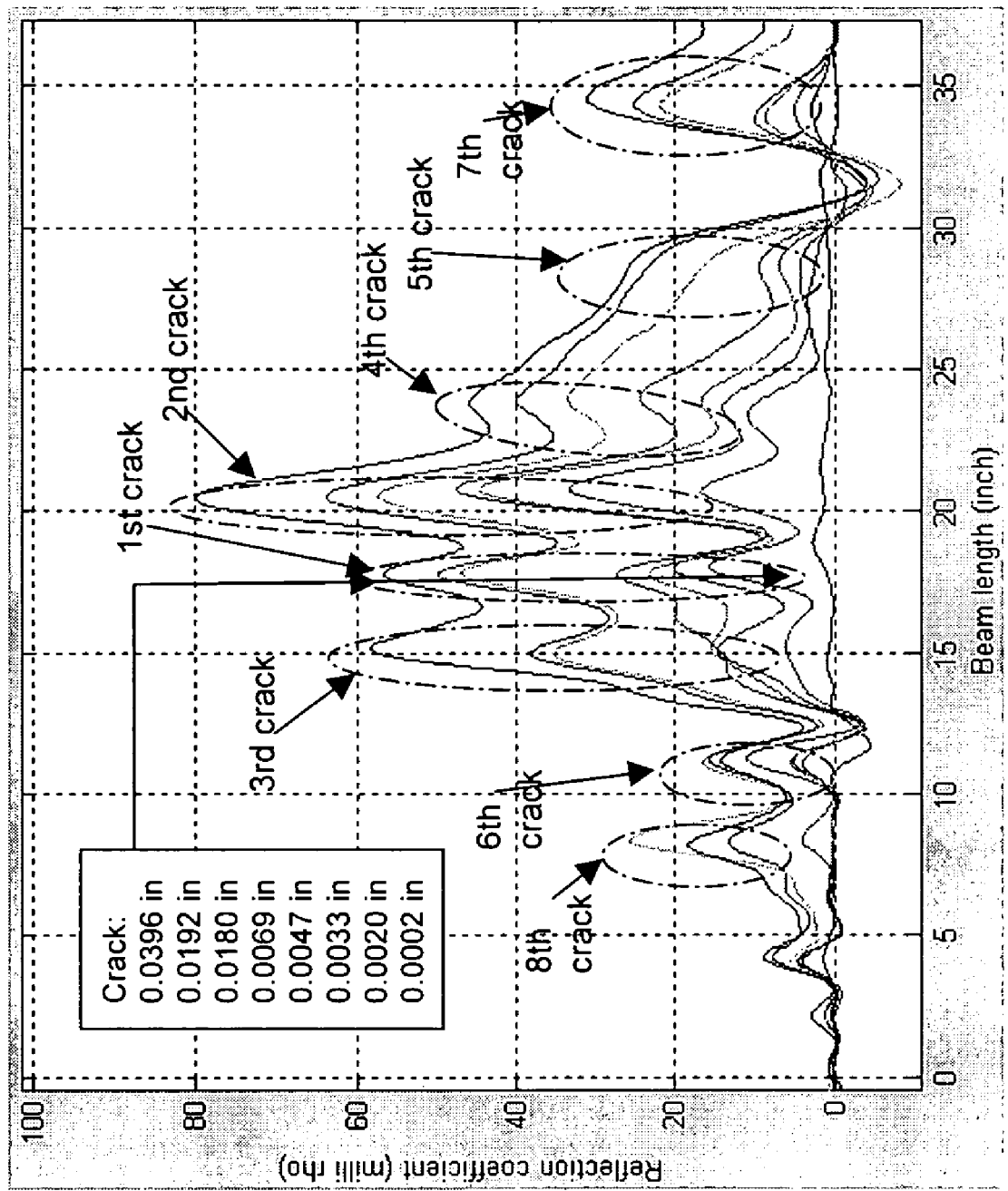
FIG. 11 shows sensing results of a prototype sensor to the cracking of concrete in a test RC beam.

Beam 1c developed many cracks across a substantial span portion of its mid span. In this case, due to the presence of multiple cracks, the load-displacement relation appears truly nonlinear after the first crack corresponding to a load of approximately 4 kips. The yielding of the reinforcement occurs around 20 kips, which is twice the ultimate load of Beam 2a due to the use of No. 4 reinforcement instead of No. 3. The sensed reflection coefficient is shown in FIG. 11. The local maxima of the reflection coefficient curve shown in FIG. 11 correspond to the locations of multiple cracks observed on the beam. It was also observed that the change in reflection coefficient generally follows the sequence of crack development. The peak coefficient observed reached 0.08 for Beam 1c.

Figure 12:
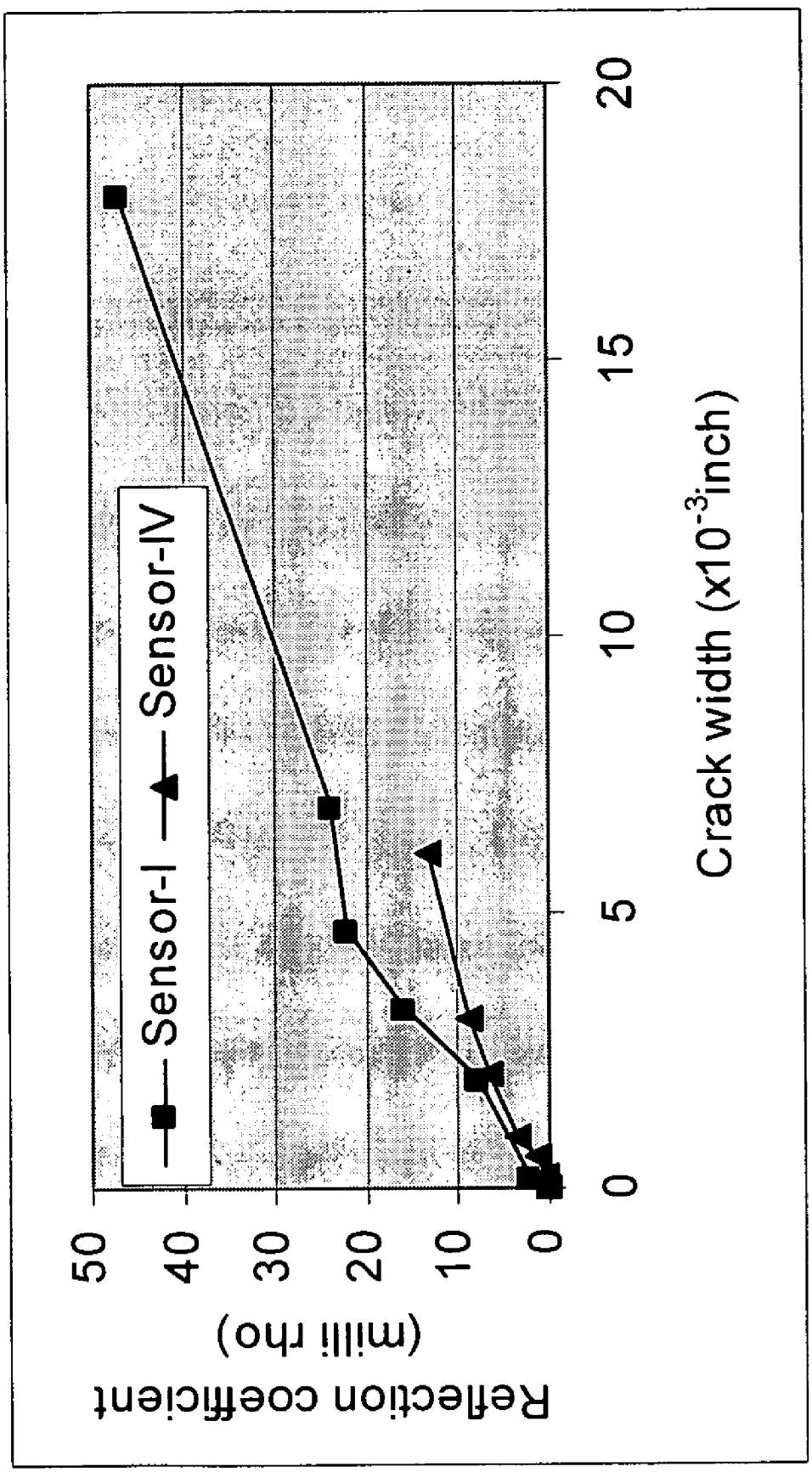
FIG. 12 shows a plot of peak reflection coefficient corresponding to a first crack in a test beam as a function of crack width.

For each RC beam tested, the width of a crack at mid-span was measured with an extensometer. The peak reflection coefficient of the beam corresponding to the first crack is plotted in FIG. 12 as a function of crack width. It can be observed from the figure that, for Beam 2a/Sensor-IV, the reflection coefficient linearly increases with crack width up to 0.0061 in. For Beam 1c/Sensor-I, the coefficient increases linearly with crack width up to 0.002 in., then with a higher slope corresponding to the rapid increase in separation of the cable outer conductor up to 0.0033 in. After that, the coefficient-width curve resumes the initial slope up to 0.0047 in. and eventually appears to have a reduced slope due to the effect of adjacent cracks. These results agree with the calibration results discussed above.

As shown from the above results discussion, test coax cable sensors of the invention demonstrate high sensitivity in strain measurement and crack detection of an associated structure, as validated with laboratory tests of RC beams. The numerical simulations and experiments show 10~50 times more sensitivity to strain effect than commercial coax cables and an ability to measure a reflection coefficient of 6~7 per unit strain. The location of cracks identified from beam tests matches well with the physical pattern observed from the test specimens. The cable sensor of the invention enables differentiation of the location of cracks of that are inches apart. Commercially fabricated sensor of the invention will have even better performance, as the manual assembly techniques used for prototypes lacks the precision and consistency offered by commercial assembly.

Coax cable sensors ETDR and TDT sensor systems of the invention provide an important tool for the monitoring of civil infrastructure. Buildings, bridges, roads, dams, etc. can be accurately monitored with cable sensors and sensors systems of the invention.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A coax cable sensor for use in a electrical time domain transmission or electrical time domain reflectometry system to detect and measure strain in an associated structure, the sensor comprising:
   an inner conductor defining a sensing length to correspond to the associated structure or a portion of the associated structure to be monitored and configured on one end to couple to a sensor head;
   a dielectric jacket disposed around said inner conductor and configured to electrically insulate an outer conductor over the sensing length;
   said outer conductor electrically insulated by the dielectric jacket from said inner conductor along the sensing length and being configured on one end to couple to the sensor head;
   deformation means associated with the outer conductor for creating localized deformation that creates an electrically detectable inductance change with respect to said outer conductor in response to strain applied to the coax cable sensor by the associated structure;
   wherein said deformation means comprises periodic points of discontinuity in said outer conductor; and
   wherein said outer conductor comprises an electrically conductive wrap and points of discontinuity are defined by adjacent turns of said electrically conductive wrap.

2. The sensor of claim 1, wherein said electrically conductive wrap is spirally wrapped around said dielectric jacket.

3. The sensor of claim 1, further comprising an air gap between said inner conductor and said dielectric jacket to facilitate relative movement between said inner conductor and said dielectric jacket.

4. A coax cable sensor for use in a electrical time domain transmission or electrical time domain reflectometry system to detect and measure strain in an associated structure, the sensor comprising:
   an inner conductor defining a sensing length to correspond to the associated structure or a portion of the associated structure to be monitored and configured on one end to couple to a sensor head;
   a dielectric jacket disposed around said inner conductor and configured to electrically insulate an outer conductor over the sensing length;
   said outer conductor electrically insulated by the dielectric jacket from said inner conductor along the sensing length and being configured on one end to couple to the sensor head;
   deformation means associated with the outer conductor for creating localized deformation that creates an electrically detectable inductance change with respect to said outer conductor in response to strain applied to the coax cable sensor by the associated structure;
   wherein said deformation means comprises a structure within said dielectric jacket that responds to the strain to cause a discontinuity in said outer conductor;
   further comprising an air gap between said inner conductor and said dielectric jacket to facilitate relative movement between said inner conductor and said dielectric jacket; and wherein said dielectric jacket is formed of a rigid material and said structure within said dielectric jacket comprises spiral turns of said dielectric jacket.

5. A coax cable sensor for use in a electrical time domain transmission or electrical time domain reflectometry system to detect and measure strain in an associated structure, the sensor comprising:
  an inner conductor defining a sensing length to correspond to the associated structure or a portion of the associated structure to be monitored and configured on one end to couple to a sensor head;
  a dielectric jacket disposed around said inner conductor and configured to electrically insulate an outer conductor over the sensing length;
  said outer conductor electrically insulated by the dielectric jacket from said inner conductor along the sensing length and being configured on one end to couple to the sensor head;
  deformation means associated with the outer conductor for creating localized deformation that creates an electrically detectable inductance change with respect to said outer conductor in response to strain applied to the coax cable sensor by the associated structure;
  wherein said deformation means comprises a shield disposed around said outer conductor and configured to electrically shield the outer conductor over the sensing length, and the sensor further comprises a second outer conductor shielded from said outer conductor over the sensing length by the shield, the shield responding to strain by forming localized gaps permitting a coupling between said outer conductor and said second outer conductor.

6. An electrical time domain transmission structural monitoring system, comprising:
  a sensor according to claim 5;
  a signal generator for generating a measurement signal;
  a detector for detecting signals from the sensor; and
  means for coupling said signal generator and said detector to said sensor.

7. The sensor of claim 6, further comprising an air gap between said inner conductor and said dielectric jacket to facilitate relative movement between said inner conductor and said dielectric jacket.

8. A coax cable sensor for use in a electrical time domain transmission or electrical time domain reflectometry system to detect and measure strain in an associated structure, the sensor comprising:
  an inner conductor defining a sensing length to correspond to the associated structure or a portion of the associated structure to be monitored and configured on one end to couple to a sensor head;
  a dielectric jacket disposed around said inner conductor and configured to electrically insulate an outer conductor over the sensing length;
  said outer conductor electrically insulated by the dielectric jacket from said inner conductor along the sensing length and being configured on one end to couple to the sensor head;
  deformation means associated with the outer conductor for creating localized deformation that creates an electrically detectable inductance change with respect to said outer conductor in response to strain applied to the coax cable sensor by the associated structure;
  wherein said deformation means comprises a constrictor outside of said outer conductor configured to create localized deformation of said dielectric jacket and said outer conductor in response to strain.

9. The sensor of claim 8, wherein said constrictor comprises a stiff spiral wrapped around said outer conductor over the sensing length.

10. The sensor of claim 8, further comprising an air gap between said inner conductor and said dielectric jacket to facilitate relative movement between said inner conductor and said dielectric jacket.

11. An electrical time domain transmission structural monitoring system, comprising:
  a sensor according to claim 8;
  a signal generator for generating a measurement signal;
  a detector for detecting signals from the sensor; and
  means for coupling said signal generator and said detector to said sensor.

12. A coax cable sensor for use in a electrical time domain transmission or electrical time domain reflectometry system to detect and measure strain in an associated structure, the sensor comprising:
  an inner conductor defining a sensing length to correspond to the associated structure or a portion of the associated structure to be monitored and configured on one end to couple to a sensor head;
  a dielectric jacket disposed around said inner conductor and configured to electrically insulate an outer conductor over the sensing length;
  said outer conductor electrically separated by the dielectric jacket from said inner conductor along the sensing length and being configured on one end to couple to the sensor head; and
  localized strain translators associated with said outer conductor along the sensing length to convert strain into a measurable reflectivity coefficient change;
  wherein said dielectric jacket is formed of a rigid spiral material and said localized strain translators comprise spiral turns of said rigid spiral material.

13. A coax cable sensor for use in a electrical time domain transmission or electrical time domain reflectometry system to detect and measure strain in an associated structure, the sensor comprising:
  an inner conductor defining a sensing length to correspond to the associated structure or a portion of the associated structure to be monitored and configured on one end to couple to a sensor head;
  a dielectric jacket disposed around said inner conductor and configured to electrically insulate an outer conductor over the sensing length;
  said outer conductor electrically separated by the dielectric jacket from said inner conductor along the sensing length and being configured on one end to couple to the sensor head; and
  localized strain translators associated with said outer conductor along the sensing length to convert strain into a measurable reflectivity coefficient change;
  wherein said localized strain translators comprise portions of a constrictor outside of said outer conductor.

* * * * *